United States Patent
Seyedi et al.

(10) Patent No.: US 11,036,014 B1
(45) Date of Patent: Jun. 15, 2021

(54) COHERENT OPTICAL SOURCE BASED ON PACKAGED GCSEL

(71) Applicant: HEWLETT PACKARD ENTERPRISE DEVELOPMENT LP, Houston, TX (US)

(72) Inventors: Mir Ashkan Seyedi, Palo Alto, CA (US); Geza Kurczveil, Santa Barbara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/777,868

(22) Filed: Jan. 30, 2020

(51) Int. Cl.
| | |
|---|---|
| *H04B 10/27* | (2013.01) |
| *G02B 6/42* | (2006.01) |
| *H04B 10/50* | (2013.01) |
| *G02B 6/293* | (2006.01) |
| *H04B 10/61* | (2013.01) |
| *H04B 10/54* | (2013.01) |

(52) U.S. Cl.
CPC ....... *G02B 6/4215* (2013.01); *G02B 6/29338* (2013.01); *H04B 10/27* (2013.01); *H04B 10/504* (2013.01); *H04B 10/54* (2013.01); *H04B 10/61* (2013.01)

(58) Field of Classification Search
CPC ...... H04B 10/27; H04B 10/504; H04B 10/54; G02B 6/4215
See application file for complete search history.

(56) References Cited

U.S. PATENT DOCUMENTS

| | | | |
|---|---|---|---|
| 6,525,872 B1 | 2/2003 | Ziari | |
| 7,113,526 B2 | 9/2006 | Evans et al. | |
| 7,535,631 B2 | 5/2009 | Brown | |
| 8,750,717 B1 | 6/2014 | Yap | |
| 8,855,452 B2 | 10/2014 | Andry et al. | |
| 8,982,450 B2 | 3/2015 | Cox | |
| 9,088,371 B2 | 7/2015 | Witzens | |

(Continued)

FOREIGN PATENT DOCUMENTS

WO   WO2017151416 A2   9/2017

OTHER PUBLICATIONS

Extended European Search Report received for EP Patent Application No. 19182992.8, dated Nov. 15, 2019, 9 pgs.

(Continued)

*Primary Examiner* — Dzung D Tran
(74) *Attorney, Agent, or Firm* — Sheppard Mullin Richter & Hampton LLP

(57) ABSTRACT

Improved systems and methods are provided to implement coherent communication. The system includes an interposer to route the components of an integrated photonic circuit. The interposer provides an interface to couple the components of the integrated photonic circuit including an optical source, modulator, coherent transmitter, coherent receiver, and interconnects therebetween. The optical source can be a grating-coupled surface-emitting laser (GCSEL). The GCSEL splits an optical signal into two symmetrical optical signals that are directed by a waveguide to a coherent transmitter and/or a coherent receiver of the integrated photonic circuit. Coherent communication is maintained and the need for a second laser in the coherent receiver is avoided through the structure of the GCSEL granting dual functional to the optical source.

6 Claims, 5 Drawing Sheets

(56) References Cited

U.S. PATENT DOCUMENTS

| | | | |
|---|---|---|---|
| 9,313,562 B2 | 4/2016 | Waldman et al. | |
| 9,507,111 B2* | 11/2016 | Collins | G02B 6/4296 |
| 9,571,200 B2 | 2/2017 | Saathoff et al. | |
| 9,612,401 B2 | 4/2017 | Frankel et al. | |
| 9,798,087 B1* | 10/2017 | Mathai | G02B 6/4269 |
| 9,876,580 B2 | 1/2018 | Yuan et al. | |
| 10,224,628 B2 | 3/2019 | Vidal Drummond et al. | |
| 10,551,577 B2* | 2/2020 | Seyedi | G02B 6/4214 |
| 2003/0006416 A1 | 1/2003 | Dudoff et al. | |
| 2011/0170856 A1 | 7/2011 | Kannari et al. | |
| 2012/0177381 A1* | 7/2012 | Dobbelaere | H04B 10/43 398/139 |
| 2014/0193115 A1 | 7/2014 | Popovic | |
| 2015/0069113 A1 | 3/2015 | Qing et al. | |
| 2016/0277115 A1 | 9/2016 | Peterson et al. | |
| 2017/0151416 A1 | 6/2017 | Kutikov et al. | |
| 2019/0033542 A1* | 1/2019 | Epitaux | G02B 6/4214 |
| 2019/0089461 A1* | 3/2019 | Sun | H01S 5/02248 |

OTHER PUBLICATIONS

Kopp, C. et al., "Chip-to-chip Optical Interconnections between Stacked Self-Aligned SOI Photonic Chips," (Research Paper), Optics Express, Mar. 2012, vol. 20, No. 7, https://www.researchgate.net/publication/221978445_Chip-to-chip_optical_interconnectio ns_between_stacked_self-aligned_SOI_photonic_chips, 10 pgs.

Kruschke, B., et al., "Beam Combining Techniques for High-Power High-Brightness Diode", May-Jun. 2005, <https://www.ll.mit.edu/news/fan_laserbeamcombining.pdf>, 6 pgs.

Lin, S., "Electronic-Photonic Co-Design of Silicon Photonic Interconnects", Technical Report No. UCB/EECS-2017-208, http://www2.eecs.berkeley.edu/Pubs/TechRpts/2017/EECS-2017-208.html, Dec. 13, 2017, 114 pages.

* cited by examiner

COHERENT OPTICAL SOURCE BASED ON PACKAGED GCSEL

RELATED APPLICATIONS

This application is related to granted and co-owned U.S. patent application Ser. No. 15/953,765 (U.S. Pat. No. 10,429,601), which was filed on Apr. 16, 2018 and entitled "COMB LASER ARRAYS FOR DWDM INTERCONNECTS." The disclosure of which is incorporated herein by reference in its entirety. This application is also related to granted and co-owned U.S. patent application Ser. No. 16/023,596 (U.S. Pat. No. 10,551,577), which was filed on Jun. 29, 2018 and entitled "LASER ASSEMBLY PACKAGING FOR SILICON PHOTONIC INTERCONNECTS." The disclosure of which is incorporated herein by reference in its entirety.

DESCRIPTION OF RELATED ART

Based on the current trends in network traffic, the increasing number of apps and devices, and popularity of bandwidth-intensive high definition video, there will be an urgent need for more bandwidth-efficient transmission systems in the near future. Cloud computing, the Internet of Things (IoT), over the top (OTT) video, and advent of 5G are merely a few technologies driving unobtainable bandwidth and unpredictable traffic patterns. Existing systems cannot meet the demand resulting from the rapid increase in network capacity requirements. However, the emerging field of silicon photonics, such as coherent optics, can potentially address these emerging capacity problems.

Coherent optical transmission is a technique that uses modulation of the amplitude and phase of the light to enable the transport of considerably more information through on-chip optical waveguides and off-chip fiber optic cables. Coherent optics can offer higher bit-rates, greater degrees of flexibility, simpler photonic line systems, and better optical performance. Thus, coherent optics is an attractive candidate for satisfying the growing technological and consumer demands for data.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
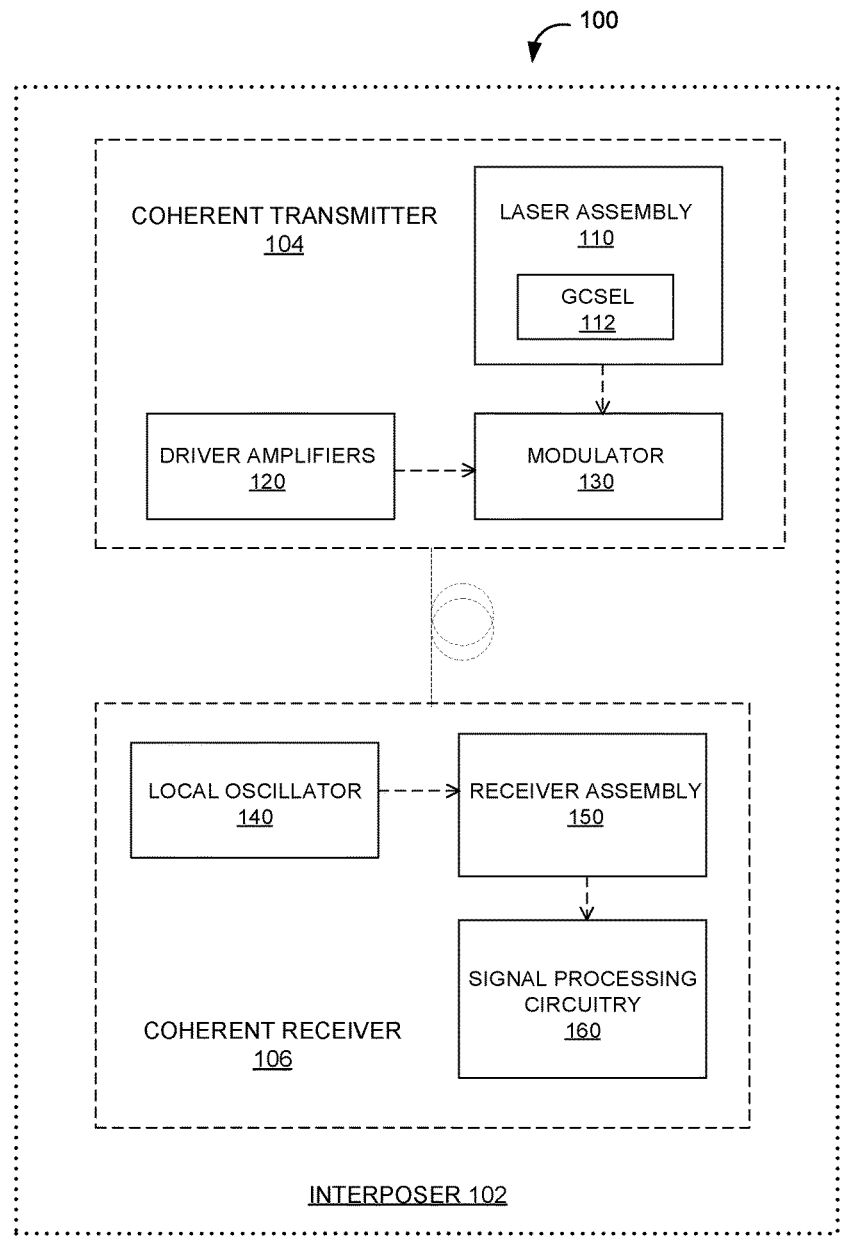
FIG. 1 illustrates an example system for coherent communication in accordance with various embodiments.

The figures are not exhaustive and do not limit the present disclosure to the precise form disclosed.

DETAILED DESCRIPTION

Silicon photonics involves the use of silicon semiconductors as the medium for optical signals, allowing much faster aggregate digital signaling than is currently possible with traditional electron-based semiconductor devices that use electrical currents. For example, optical signals can carry information on both the amplitude and the phase, which allow more complex high-order modulation schemes and higher spectral efficiency. Silicon photonics holds great promise in replacing conventional optical interconnects and electrical interconnects in today's data centers as the bandwidth-length product demand keeps growing.

Coherent communication is a type of optical communication and an application of silicon photonics. A "coherent" optical transmission can be characterized by its capability to do "coherent detection." That is, an optical receiver can tract the phase of an optical transmitter so as to extract any phase and frequency information carried by a transmitted signal. Coherent detection can increase the optical power efficiency of an optical link or individual optical channels can be increased. Advantageously a lower amount of optical power is required for a channel with a given data rate. Coherent detection is based on optically mixing the incoming optical signal (i.e., transmitted signal) at the optical receiver with light generated by a local coherent light source (i.e., receiver light source such as a tunable laser and controlled for its phase). Mixing refers to combining (summing) the incoming light (i.e., transmitted signal) with at least a portion of the locally generated light/receiver light source, thus generating an interference signal. The phase combination effectively enhances the sensitivity of a receiver by enabling more sensitive detection of the optical signal. Consequently, coherent optics offers higher bit-rates, greater degrees of flexibility, simpler photonic line systems, and better optical performance Nevertheless, while coherent communication or coherent optics provides a significant improvement over the current means to implement communication (i.e., electrical or photonic direct detection), widespread adoption has been largely limited due to its high cost, power, and complexity. For long-reach communication, the primary goal is to achieve high spectral efficacy for each optical channel. Silicon photonics transmitters with high-order modulation schemes such as quadrature amplitude modulation (QAM) have been demonstrated in limited instances. On the receiver side, the major challenge for coherent communication has been optical-carrier phase tracking as well as PMD (polarization mode dispersion) removal, which requires high speed analog-to-digital converters (ADC) and digital signal processing (DSP).

Further related technologies include a packaged grating-coupled surface-emitting laser (GCSEL) described in U.S. Pat. No. 10,429,601 filed on Apr. 16, 2018 and entitled "COMB LASER ARRAYS FOR DWDM INTERCONNECTS," which is incorporated herein by reference in its entirety. This patent discloses an example of a photonic integrated circuit package that includes an array of laser modules, photodiode, communication unit, interconnects, and an ASIC (application specific integrated circuit) on or within a silicon interposer. The silicon interposer can be characterized as an electrical interface that routes optical signals, via associated waveguides, to designated components. The waveguides within the silicon interposer form optical buses that interconnect elements attached to respective buses. Thus, numerous elements of the photonic circuitry can be optically coupled via the silicon interposer. U.S. Pat. No. 10,429,601 provides further details regarding the incorporation of a silicon interposer with photonic integrated circuitry.

The present disclosure provides coherent communication through a single optical source or laser that performs the functions traditionally attributed to two distinct optical sources without sacrificing performance. In the context of coherent communication, usually one optical source provides a first optical signal/power to a transmitter circuit and an additional optical source provides a second optical signal/power to a receiver circuit. As a consequence of two distinct optical sources, the system is complex, induces noise from additional components, and often fails to achieve coherence (e.g., phase and frequency distinct).

Further embodiments of the present disclosure can be directed to a cost-effective solution through photonic integrated circuitry and an interposer to route an optical signal. The photonic integrated circuitry can be packaged and may comprise an optical source (e.g., GCSEL), waveguide, optical ring resonators, interferometer, transmitter circuit, and receiver circuit. In various embodiments, the presently disclosed technology may bifurcate an optical signal and direct the resulting signals to two distinct optical pathways. The first optical pathway can be coupled to an interferometer and lead to a transmitter circuit. The second optical pathway can also be coupled to an interferometer and lead to the receiver circuit or a local oscillator. Thus, the need for a second optical source is substantially reduced and issues such as asymmetric loss, phase shift, and temperature drift are circumvented. More importantly, the presently disclosed technology bifurcates the output of a single optical source to ensure the optical signals have the same frequency as well as fixed phase relationship, and as a result, coherence is achieved.

Some embodiments of the presently disclosed technology may be directed to aspects of a packaged grating-coupled surface emitting laser (GCSEL). GCSELs have the desirable traits of both conventional edge-emitting lasers and vertical cavity semiconductor lasers. More importantly, the GCSEL architecture provides a single-device technology platform versatile enough to be adapted for different applications, such as an improved coherent optical source.

In various embodiments, the laser assembly may comprise multi-wavelength comb laser or a single wavelength laser. In one example, the comb laser is a quantum dot based diode laser operating as an optical frequency comb generator that generates a low-noise multi-spectral output of approximately equidistant spectral lines. Quantum dots provide a good gain material for semiconductor comb lasers, as their gain spectrum is inhomogenously broadened. This allows the laser to have stable emission in multiple cavity resonance across a wider temperature range as compared to other gain materials without gain competition leading to unstable comb components.

In some embodiments, the laser assembly can be coupled to a silicon interposer through a flip-chip process that effectively aligns the laser assembly with the silicon interposer, such as the flip-chip process as described in detail in U.S. Pat. No. 10,551,577 filed on Jun. 29, 2018 and entitled "LASER ASSEMBLY PACKAGING FOR SILICON PHOTONIC INTERCONNECTS," which is incorporated herein by reference in its entirety. Accordingly, the output of the laser assembly may then be effectively communicated to on-chip photonic waveguides, via grating couplers, to guide associated optical signals to various components on-chip. In one implementation, the grating couplers may be formed by periodically notching an on-chip photonic waveguide to create a diffraction grating such that light that is diffracted off the rulings will constructively interfere toward a direction into the waveguide and/or an optical fiber. A diffraction period or width of each ruling can be chosen such that scattering from individual rulings constructively interferes at a desired angle.

Embodiments of the presently disclosed technology include a single optical source with dual functionality that is directed at the combination of photonic integrated circuitry and an interposer to route an optical signal to distinct optical pathways for coherent communication. Moreover, the advantages enabled by the present disclosure (e.g., circumvents problems of asymmetric loss, phase shift, and temperature) are significant. Furthermore, since the optical local oscillator and the optical carrier can originate from the same laser source, they are inherently phase synchronous in the ideal situation.

In various embodiments, the laser source comprises surface-emitting lasers controlled by electronic components on- and off-chip. As described above, the surface-emitting lasers may include a grating-coupled surface-emitting laser (GCSEL) or a vertical-cavity surface-emitting laser (VCSEL). The control of the laser source may be provided by an ASIC (Application Specific Integrated Circuit) and/or microprocessor coupled or disposed on a substrate, such as the silicon interposer. The ASIC can also control data communication, data transmission, and other operations.

In various embodiments, a grating coupler can be used to direct and magnify optical signals generated by a laser. The optical signals may then enter a waveguide which channels the optical signal to an integrated circuit. A waveguide can be characterized as a device that confines electromagnetic energy and channels it from one point to another. More generally, a waveguide may refer to any structure that conveys electromagnetic waves between its endpoints. Essentially, a waveguide is a hollow metal pipe that can be used to carry electric, magnetic, and optical waves.

In various embodiments, an optical source such as a laser provides an optical signal to an input grating. The input grating bifurcates and directs the optical signal to a first and second output grating. Thereafter, each output grating can be connected with a waveguide that channels optical signals from each output grating to specified locations. For example, an optical signal goes to a transmitter for modulation and another optical signal can be forwarded to a receiver or local oscillator (LO). In regards to modulation, the modulation schemes may include Pulse Amplitude Modulation (PAM), Phase Shift Keying (PSK), and Quadrature Amplitude Modulation (QAM). QAM is the most common advanced modulation scheme used for coherent communication. The modulation can be performed in one example by coupling an optical ring resonator or microring with a multimode interferometer (MMI).

FIG. 1 illustrates an example system for coherent communication in accordance with various embodiments. The system 100 shows the high-level relationships between the main components involved in the optical transmission of the present disclosure. Namely, a coherent transmitter 104 and coherent receiver 106 disposed on an interposer 102. The elements of the coherent transmitter 104 may can include a laser assembly 110, drivers 120, and modulator 130. The laser assembly 110 may further include an optical source such as a grating-coupled surface-emitting laser (GCSEL) 112. The optical source 112 can provide light to the modulator 130, which transduces electrical data (i.e., supplied by the modulator driver 120) into a modulated optical signal. The system 100 can support both off and on-chip optical sources 112. However, FIG. 1 depicts an on-chip optical source 112.

After the optical signal is generated, a bus waveguide routes it to different modulators 130 used for actual data transmission. The modulator 130 translates the modulator driver's 120 electrical information into a modulated optical signal. Example modulators 130 can include QAM, PAM, and BPSK, and microrings. Optical resonator-based implementations, such as microrings, can be preferred due to their low operating voltage and compact size. Specifically, silicon microring resonators (MRRs) may be used.

Next, the modulated optical signal is transmitted via a bus waveguide or waveguide. Waveguides are the paths through which light is routed. Common waveguide materials include silicon and polymer, but metal is also feasible. Additionally, silicon is preferred for on-chip optical links because polymer-based modulators are bulky and require high voltage drive for high frequency operation. The modulated optical output can be fed into a coherent receiver 106 via the waveguide. The components of the coherent receiver 106 include a local oscillator (LO) 140, receiver assembly 150, and signal processing circuitry 160. The LO 140 may be used to amplify the modulated optical signal and obtain phase coherence. The laser assembly 110 provides power for both the coherent transmitter 104 and the coherent receiver 106. An output grating incorporated in the design of the GCSEL directs a laser output to two input gratings disposed within a layer of the silicon interposer 102 (See FIG. 2). The two input gratings diffract received optical signals into local waveguides coupled to the coherent transmitter 104 and/or coherent receiver 106 circuitry. The receiver assembly 150 can include a photodetector. The photodetector may be a photodiode or photo transistor that converts an optical signal to an electrical signal for signal processing circuitry 160.

Figure 2A:
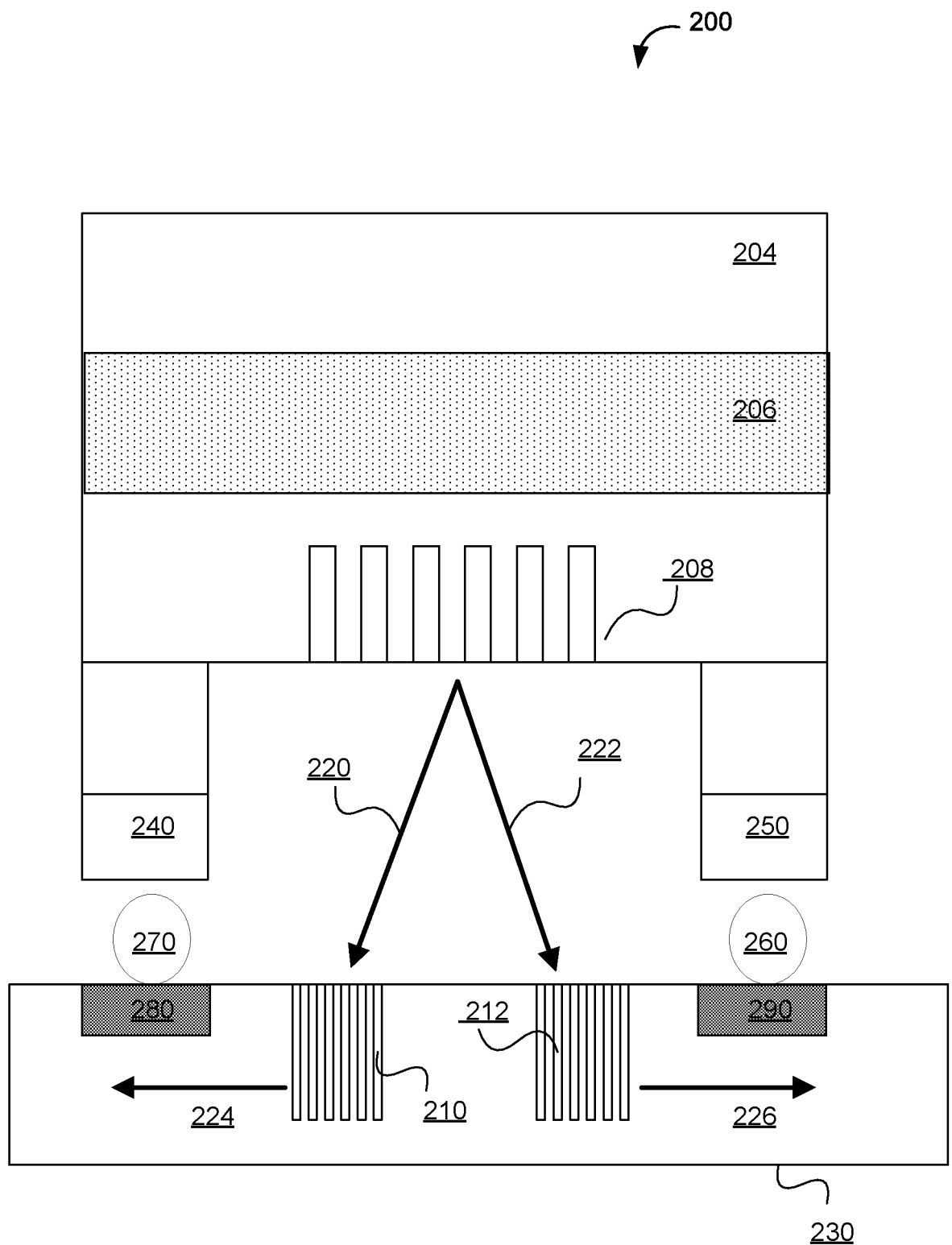
FIG. 2A illustrates an example laser design in accordance with various embodiments.

FIG. 2A illustrates an example laser design in accordance with various embodiments. The laser source 200 may be a grating-coupled surface-emitting laser (GCSEL) 204 in which light from a laser can be diffracted by a grating lased out in the output surface of the laser. The GCSEL may include a specified gain medium to improve performance of the laser. In one example, the gain medium is quantum dots 206. Quantum dots provide a good gain material for semiconductor comb lasers, as their gain spectrum is inhomogenously broadened. This allows the laser to have stable emission in multiple cavity resonance without gain competition leading to unstable comb components.

The GCSEL may also include metallic contacts 240 and 250 on the output side of the GCSEL. The metallic contacts 240 and 250 are in contact with solder bumps 260 and 270, respectively. The solder bumps 260 and 270 are also in contact with metallic contacts 280 and 290 that are disposed on the silicon interposer 230. The solder bumps 260 and 270 serve to effectively align the GCSEL and silicon interposer in a cost-effective manner.

The functional relationship between the GCSEL and silicon interposer begins with the GCSEL outputting an optical signal towards a grating coupler 208 which redirects and splits the optical signal. The angle of diffraction can be modified according to variety of factors such refractive index, grating spacing or periodicity, height of grating, wavelength of laser, intensity of the light, etc. Any desired angle may be achieved based on desired direction by notching a substrate to create a diffraction grating such that light is diffracted off the rulings will constructively interfere toward a desired direction. The presently disclosed technology uses the grating to split a single optical signal into two optical signals 220 and 222. Grating coupler 208 provides the advantage of equally bifurcating the single optical signal. That is, the two optical signals, 220 and 222, can be symmetrical. Once split, the two optical signals are directed to respective grating couplers edged into a layer of a silicon interposer 230. Optical signal 220 can be directed to grating coupler 210 while optical signal 220 can be directed to grating coupler 212. Grating couplers 210 and 212 may be formed by notching a waveguide integrated within a silicon interposer. The optical signals 224 and 226 may then be routed to an integrated circuit. For example, a coherent transmitter and coherent receiver.

Figure 2B:
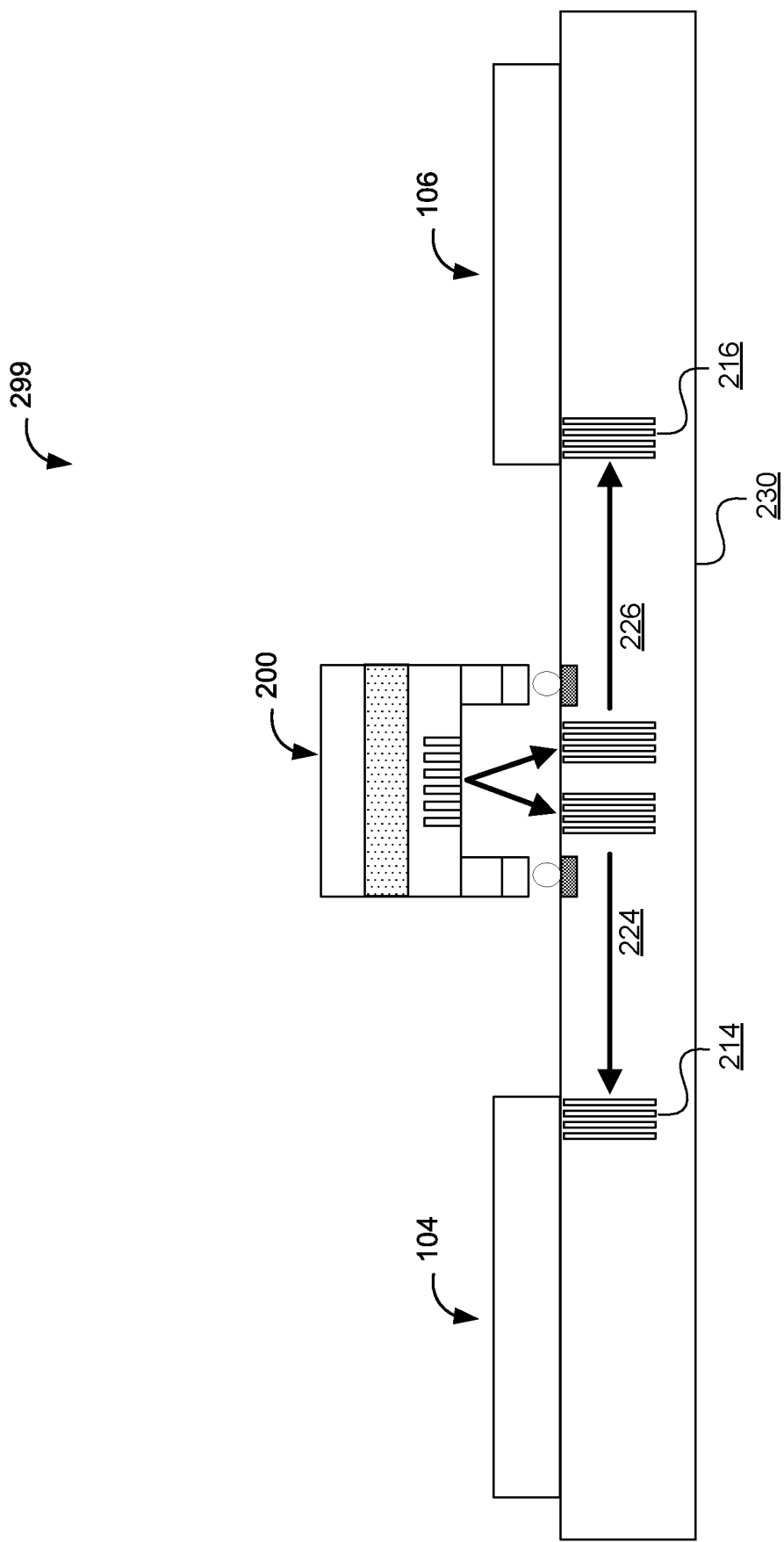
FIG. 2B illustrates an example photonic integrated circuitry in accordance with various embodiments.

FIG. 2B illustrates an example packaged photonic integrated circuit 299 in accordance with embodiments of the technology disclosed herein. The example packaged photonic integrated circuit 299 illustrates the example laser source 200 discussed with respect to FIG. 2A disposed on the silicon interposer 230, with the coherent transmitter 104 and the coherent receiver 106 discussed with respect to FIG. 1 disposed on the silicon interposer 230 as well. Two interposer couplers 214 and 216 enabling the split optical signals 224 and 226 to be coupled into the coherent transmitter 104 and the coherent receiver 106, respectively. As discussed with respect to FIG. 1, the technology disclosed herein enables a single laser source to provide an optical signal to both the transmitter circuitry and the receiver circuitry, reducing the costs associated with packaging the chip by reducing the need for a secondary light source for modulation operations. The same light source can be used to feed both the modulator of the transmitter and the local oscillator of the receiver. As shown in FIG. 2B, the split optical signals 224 and 226 can be routed through the waveguide of silicon interposer 230 in opposite directions, towards the coherent transmitter 104 and the coherent receiver 106, respectively. In some embodiments, the interposer couplers 214 and 216 may be one of a plurality of coupling means known in the art.

For brevity, the present technology is described in regard to the implementation of a coherent telecommunications link. However, by using an interposer with photonic integrated circuitry, the optical signal can be routed according to the specified requirements of corresponding implementations and their components. That is, applications that require splitting an optical signal and directing the resulting signals to predetermined components of an integrated circuitry.

Figure 3:
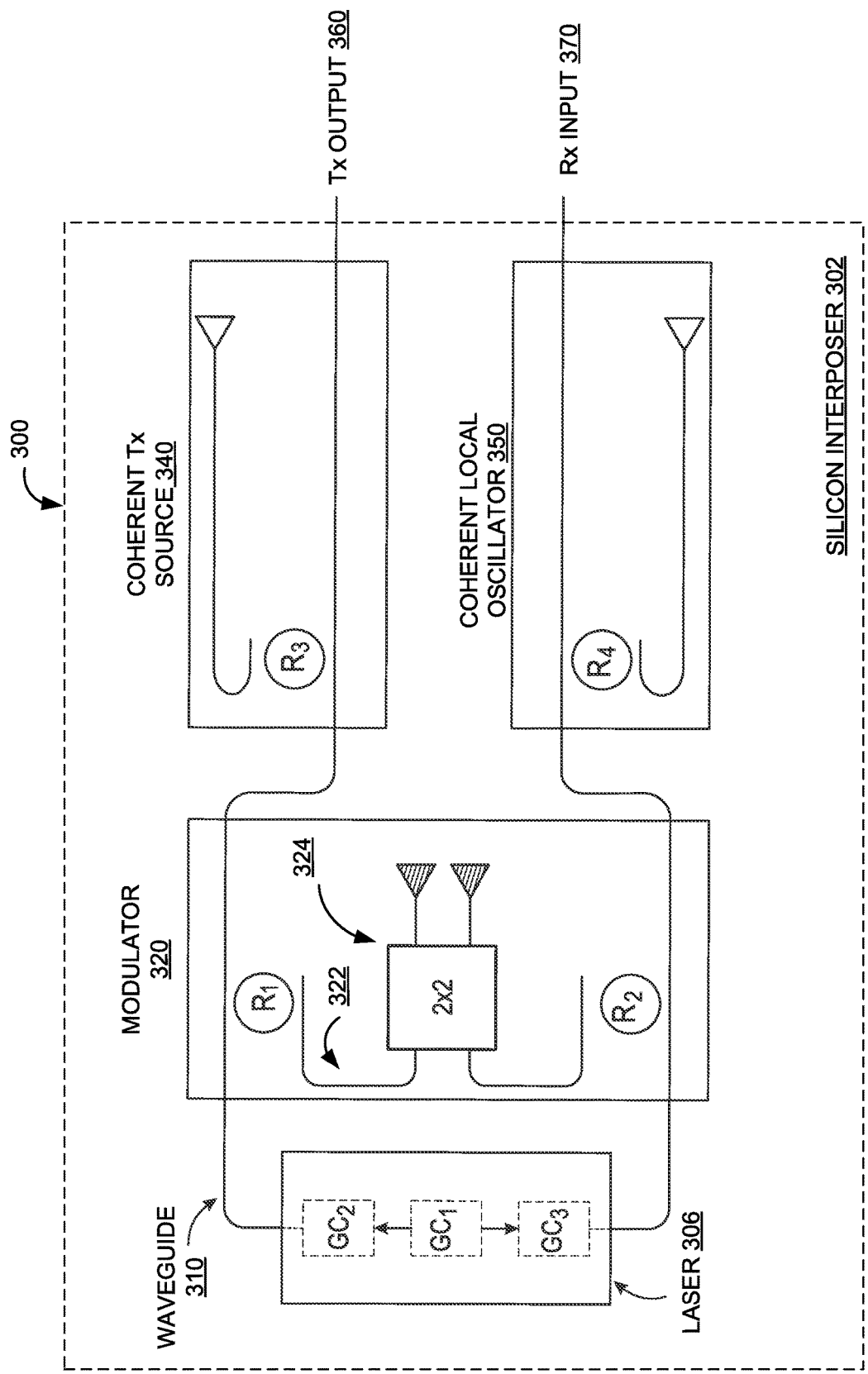
FIG. 3 illustrates an example top-down representation of an integrated photonic circuit in accordance with various embodiments.

FIG. 3 illustrates an example top-down representation of an integrated photonic circuit in accordance with various embodiments. An integrated photonic circuit 300 can be disposed on and within an interposer 302 to route electrical and optical signals on the chip. The components of the circuit may comprise a laser 306, grating couplers GC1-GC3, waveguide 310, modulator 320, bus waveguide 322, interferometer 324, microrings R1-R4, coherent transmitter source 340, and coherent local oscillator 350.

The functional relationship between components of the integrate photonic circuit in this embodiment can be described as follows. An optical source such as laser 306 outputs an optical signal that is split by grating coupler GC1 and directed to grating couplers GC2 and GC3. The grating couplers GC2 and GC3 diffract the split optical signals to respective pathways formed by waveguide 310. The waveguide 310 routes the spit optical signals to a modulator module 320. The modulator module may use the microrings R1 and R2 and a 2×2 interferometer 324 to perform QAM modulation. The microrings R1 and R2 can be heavily over-coupled to the bus waveguide 322 to help achieve a shorter photon lifetime and larger bandwidth. Following modulation, the modulated optical signal is routed by waveguide 310 to the coherent transmitter source 340. The coherent transmitter 340 includes a microring R3. The radius of microring R3 may effectively be modified to filter the wavelength of the incoming modulated optical signal. That is, the effective index inside the cavity of microring R3 may be adjusted to change the wavelength of resonance for filtering while the physical dimensions of microring R3 remain the same. Thus, the wavelength of the modulated optical signal can be modified for subsequent transmission 360. The receiver input 370 port receives an incoming modulating optical signal and is routed by the waveguide 310 to a coherent local oscillator 350. The coherent local oscillator 350 may also receive the optical signal diffracted by the grating coupler G3 via the waveguide 310. The modulated optical signal is mixed with a coherent local oscillator 350 signal to generate a signal that carries frequency and phase information. The coherent local oscillator 350 can use a microring R4 to receive the modulated optical signal at a specific laser wavelength for WDM operation (wavelength division multiplexing). Additionally, the drop port of the microring R4 can be connected to a photodetector to convert optical signals into electrical signals for signal analysis and processing.

Figure 4:
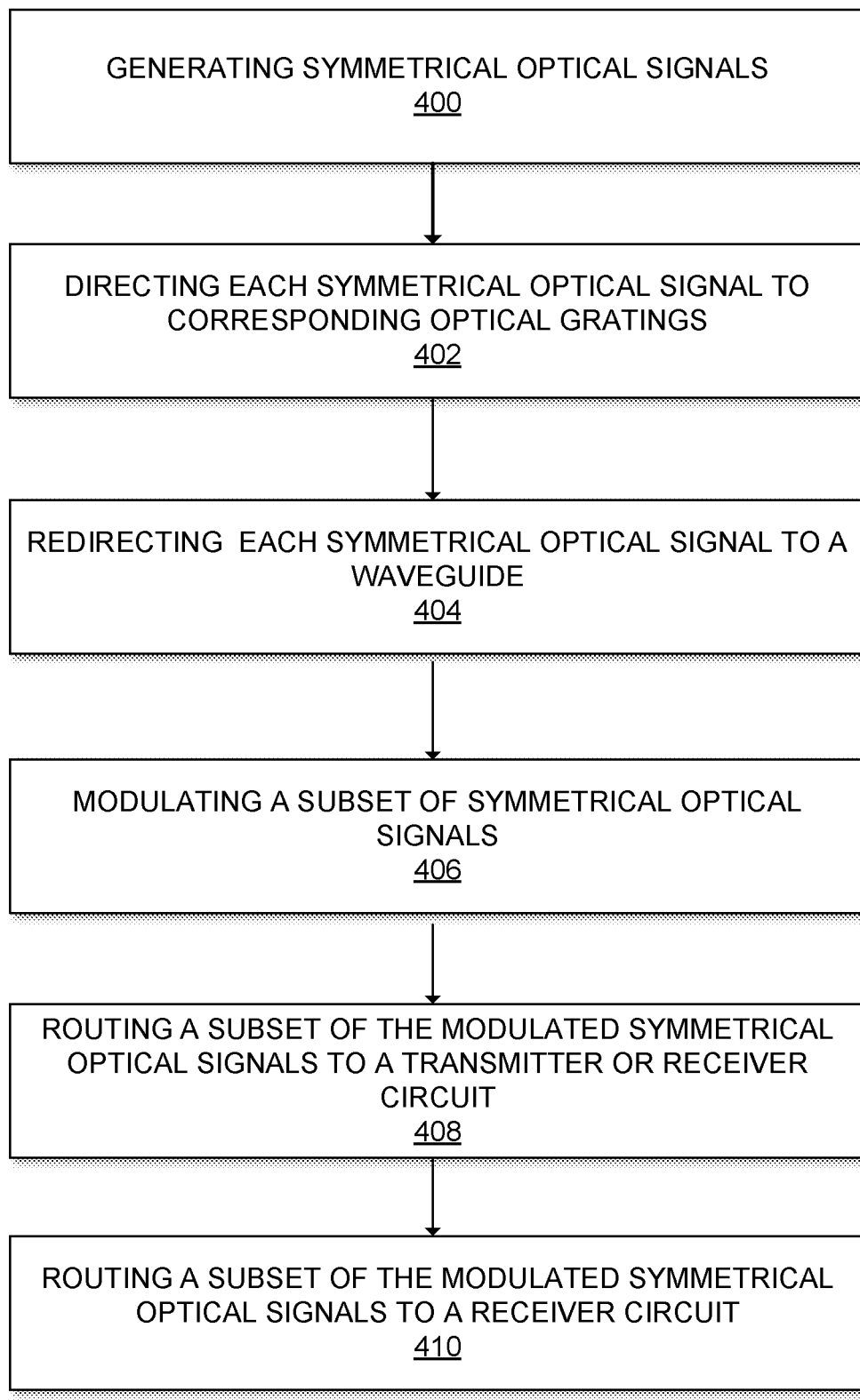
FIG. 4 illustrates is a flowchart of an example process for achieving coherent communication in accordance with various embodiments.

FIG. 4 is a flowchart of an example process for achieving coherent communication in accordance with various embodiments. The flowchart demonstrates the paths of an optical signal generated by a laser assembly. Waveguides integrated within an interposer provide channels to particular circuit components and depending on their associated functions.

At operation 400, an optical source generates an optical signal via a laser assembly. For example, the laser can be a semiconductor laser such as a grating-coupled surface-emitting laser (GCSEL). The design of the laser may further include a grating coupler to diffract the generated optical signal. Moreover, the grating coupler may split the optical signal into $2^n$ beams, where n is a positive integer and may equal 1, 2, 3, etc. For example, the generated optical signal may be split into $2^1(2)$, $2^2(4)$ or even $2^3(8)$ symmetrical beams sharing the same frequency based on respective grating couplers and the power level of the optical source (e.g., laser). The number of splits will additionally be dependent on the configuration of the transmitter/receiver circuitry and/or additional functional components involved in coherent communication. In one embodiment, the sensor described in U.S. Pat. No. 10,551,577 may be incorporated to monitor the operating parameters of the optical source, such as frequency and power level, and adjust power and frequency characteristics in accordance with the respective grating coupler design and circuit configuration.

At operation 402, each generated symmetrical optical signal is directed towards respective optical grating couplers. The optical grating couplers can be etched on a substrate, such as a silicon interposer. The number of optical gratings etched on the substrate can correspond to the number of symmetrical optical signals or number of split signals generated by the laser assembly. The laser assembly and interposer need to be properly aligned for transmission of an optical signal (i.e., property packaged). The components may be coupled by a flip-chip process utilizing solder between respective metal contacts on the laser assembly and interposer, such as the flip-chip process as described in detail in U.S. Pat. No. 10,551,577. FIG. 2 illustrates the metal contacts 240 and 250 on the laser assembly and metal contacts on the interposer 280 and 290 that surround solder bumps 260 ensuring alignment and proper functionality.

At operation 404, the optical couplers integrated with the silicon interposer redirect each symmetrical optical signal to a waveguide. As previously discussed, the grating couplers may be formed by periodically notching an waveguide to create a diffraction grating such that light that is diffracted off the rulings will constructively interfere toward a direction into the waveguide. The waveguide is formed in a channel within the silicon interposer and communicate optical signals within a packaged integrated circuit. The waveguide directs each symmetrical optical signal to a waveguide bus.

At operation 406, The waveguide bus can be connected to microring resonators and an interferometer for phase and amplitude modulation. As illustrated in FIG. 3, the drop port of each microring may be fed into the interferometer 324. The interferometer may be 2×2 or 2×1 and multi-mode. The coupling between the microring and the interferometer can provide a larger resonance bandwidth and a low Q factor (i.e., underdamped condition).

At operation 408, a subset of the modulated optical signals can be routed to the transmitter circuitry. The transmitter circuitry may include an additional microring resonator to filter the wavelength of the received optical signal. The transmitter circuitry may also include amplifier drivers. The amplifier drivers augment the modulated signal received from the modulator.

At operation 410, a subset of the modulated optical signals can be routed to the receiver circuitry. The receiver circuitry may include an additional microring resonator. The receiver circuitry may also include a photodetector. The photodetector may be a photodiode and perform balanced homodyne detection. Optical homodyne measurements are enabled because the optical source or laser is shared between the transmitter and receiver circuitry. Since, the transmitter and local oscillator have the same frequency and a constant phase relationship, the detection technique can be simplified.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
   a grating-coupled surface-emitting laser (GCSEL) comprising a laser cavity and an output grating optically coupled to the laser cavity, the output grating configured to diffract light emitted by the laser cavity out of the GCSEL;
   an optical interposer comprising a waveguide with an input end and an output end, wherein the waveguide comprising a first and second input grating, and the first and second input grating configured to receive the diffracted light emitted by the GCSEL;
   the first and second grating coupler configured to redirect the diffracted light emitted by the GCSEL into a first direction to a transmitter circuitry and into a second direction to receiver circuitry, where the diffracted light is split into symmetrical subsets of light sharing a frequency or a phase difference; and
   the transmitter circuitry comprising a transmitter and an amplifier,
   the receiver circuitry comprising a local oscillator and a photodetector; and
   wherein the transmitter circuitry and the receiver circuitry comprise a plurality of optical ring resonators, wherein a subset of the optical ring resonators are configured to be coupled to an interferometer and at least one optical ring resonator of the plurality of ring resonators coupled to the transmitter and the local oscillator.

2. The system of claim 1, wherein the waveguide is configured to be coupled to a bus waveguide, the bus waveguide configured to connect the subset of the optical ring resonators, wherein each drop port of the subset of the optical ring resonators are connected to the interferometer; and
   the connected subset of the optical ring resonators and interferometer configured to modulate the symmetrical subsets of light.

3. The system of claim 2, wherein the modulated symmetrical subsets of light are guided by the waveguide to the transmitter enabling a coherent transmitter.

4. The system of claim 2, wherein the subset of the optical ring resonators are configured to be over-coupled to the bus waveguide and the at least one optical ring resonator coupled to the transmitter and the local oscillator is configured to filter the wavelength of the symmetrical subsets of light for coherent communication.

5. The system of claim 3, wherein the interferometer uses a quadrature-amplitude modulation scheme to enable the coherent transmitter circuit.

6. The system of claim 1, wherein the grating-coupled surface-emitting laser is configured to share exclusively by the transmitter circuitry and receiver circuitry.

* * * * *